Dec. 14, 1965 C. K. BAIN Re. 25,946

METHOD AND APPARATUS FOR SINKING MINE SHAFTS

Original Filed June 13, 1952 5 Sheets-Sheet 1

INVENTOR.
CHARLES K. BAIN
BY
ATTORNEY

METHOD AND APPARATUS FOR SINKING MINE SHAFTS

Original Filed June 13, 1952 5 Sheets-Sheet 2

INVENTOR.
CHARLES K. BAIN
BY
ATTORNEY

METHOD AND APPARATUS FOR SINKING MINE SHAFTS
Original Filed June 13, 1952 5 Sheets-Sheet 3
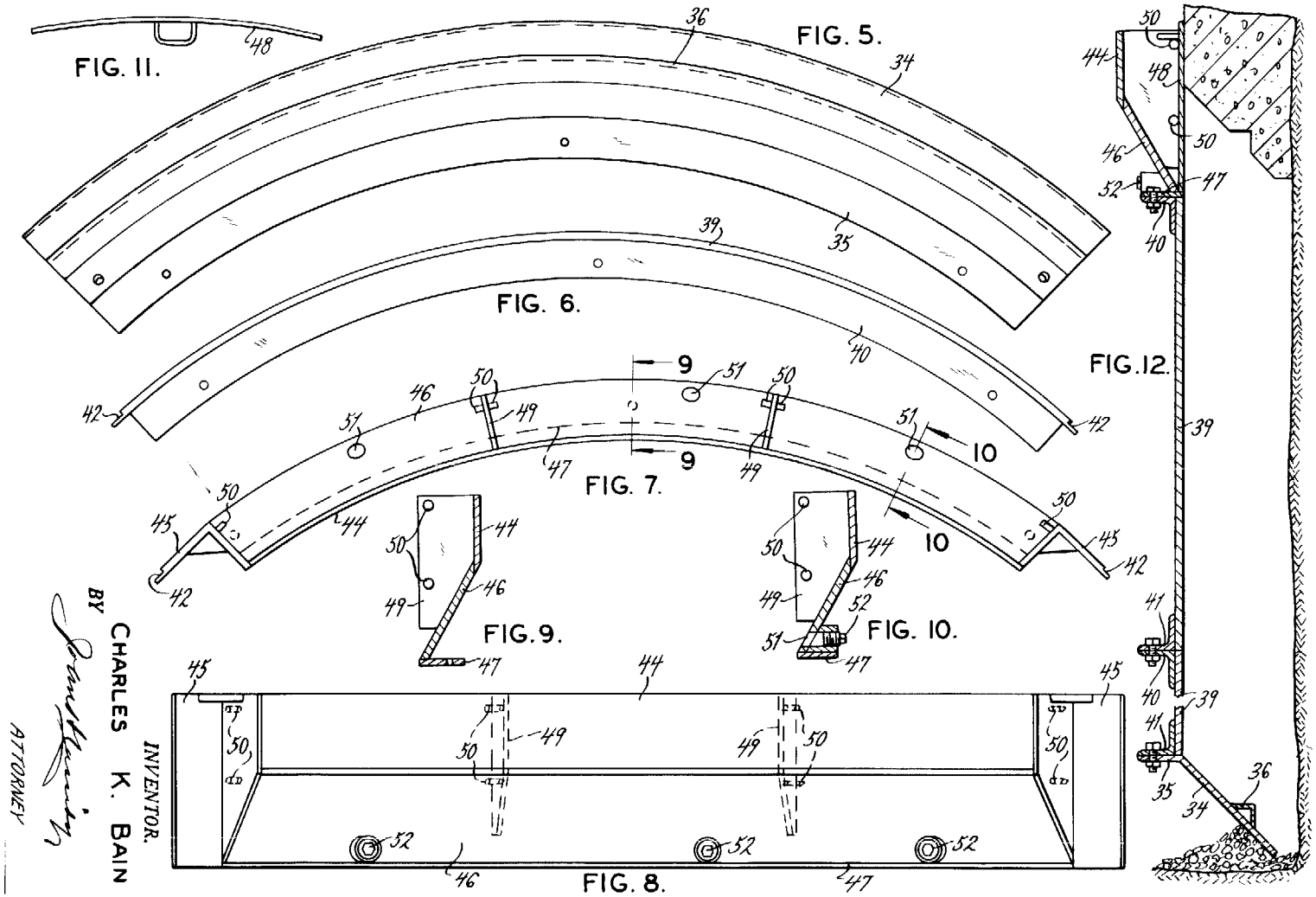
INVENTOR.
CHARLES K. BAIN
BY
ATTORNEY

METHOD AND APPARATUS FOR SINKING MINE SHAFTS

Original Filed June 13, 1952 5 Sheets-Sheet 4

INVENTOR.
CHARLES K. BAIN
BY John H. Kinney
ATTORNEY

METHOD AND APPARATUS FOR SINKING MINE SHAFTS

Original Filed June 13, 1952 5 Sheets-Sheet 5

INVENTOR.
CHARLES K. BAIN
BY
ATTORNEY

United States Patent Office

Re. 25,946
Reissued Dec. 14, 1965

25,946

METHOD AND APPARATUS FOR SINKING MINE SHAFTS

Charles K. Bain, 410 N. Newstead Ave., St. Louis, Mo.

Original No. 2,667,750, dated Feb. 2, 1954, Ser. No. 293,306, June 13, 1952. Application for reissue Aug. 19, 1964, Ser. No. 403,674
18 Claims. (Cl. 61—40)

Matter enclosed in heavy brackets [ ] appears in the original patent but forms no part of this reissue specification; matter printed in italics indicates the additions made by reissue.

This invention pertains to a method and apparatus for sinking mine shafts.

It has become customary to provide a mine shaft with a lining along the walls thereof of concrete so as to seal off water seepage and prevent crumbling and the like. The usual practice has been to excavate the shaft to its full depth and then to apply the concrete lining to the shaft walls, starting at the bottom and working upward to the top of the shaft.

*There have been some efforts in the past to form a lining in stages downwardly from the top. These have all been deficient for one reason or another.*

An object of this invention is to provide a *commercially practicable* method whereby a concrete lining may be applied to the shaft wall as the excavation of the shaft proceeds, working from the top downward.

Another object is to provide improved apparatus, whereby such method can be carried out expeditiously and at a minimum cost.

In accordance with this invention, generally stated the starting portion of the shaft, which usually extends through soil, is excavated in about 5 or 10 foot sections, or whatever distance the ground will not require artificial support. Metal forms (to be described later) are then erected along the shaft walls but spaced therefrom, and concrete is poured between said forms and the wall to form a concrete lining for the shaft wall. [At the same time vertical guide beams, usually four in number, are cast into the lining.]

*In the method, a form framework for a new section, made preferably into a rigid structure in a manner to be described, is suspended above the bottom of the excavation from each prior concrete section, and is aligned and stabilized at the top against lateral displacement. Being suspended from its top, the form framework thus far made automatically becomes substantially vertical. Then it is aligned and stabilized at the bottom against the bottom parts of the excavation by appropriate operations so that the form framework is vertical and firm, and can constitute a stable basis, with form sections assembled with it for receiving poured concrete. The concrete is then poured in from the top.*

*In addition, the method includes the subsequent steps of removing some bottom parts of the form framework after the concrete has been poured, so that the bottom of the hole is accessible for further excavation, while the faces of the new parts of the concrete lining are still protected by the forms. These steps enable further blasting and excavating to be done without waiting for the entire newly poured section to set. And finally the process involves the removal of the forms from the lately poured section after it becomes sufficiently hard, the lowering of these forms into the newly excavated parts of the hole, and the repeating of the process by including the initial steps of suspending the form framework from the lately poured section and again automatically aligning and stabilizing the top of the form framework with the preceding section of concrete.*

*In the preferred system, the form structure is assembled in the excavation. To this end, guide beams are suspended vertically in the excavation, being several in number around the wall of the hole. Each beam is suspended from and forms a continuation of a similar vertical beam secured to an anchoring member fixed in preselected position in the concrete section next above, and held to the inner surface thereof. With the several beams thus depending into the hole, a bottom frame structure, including a template, is brought into place against the lower ends of the beams, and locates the depending ends of the beams relative to each other, their lower ends being spaced above the bottom of the hole and out from the walls thereof. This operation includes finally aligning the suspended form framework so that the beams are vertical. In other words, the framework, now comprising the vertical beams and the template, is plumbed and centered in the shaft. Bottom ring means are removably secured to the frame, extending outwardly around the bottom of the framework but terminating short of the walls of the excavation. The framework is stabilized against the lower surfaces of the hole. Rock may be piled up around the outside of the bottom ring means to close the bottom of the frame. Then metal form sections, arcuate or otherwise appropriately shaped, are lowered into this part of the framework, secured to the vertical beams so that they are automatically aligned, positioned, and made stable by the framework. The forms are then complete for pouring of concrete into them to make a lining for the shaft.* When rock has been encountered a regular sequence of operations is carried out substantially as follows.

Operating in sections of, say, 10 or 20 feet depth, drilling and blasting operations are performed for such a section. This is done after the preceding section has been mucked and before the lining has been cast therein. Thus, after the last finished section of lining there is a first succeeding section which has been mucked and cleared of broken rock, and a second succeeding section which has been blasted but not mucked but is still filled with broken rock.

*The form structure is then set up in the first succeeding section in the manner aforesaid.* [A working cage carrying tools, materials and supplies necessary for placing forms, is then lowered into the shaft, guided by engagement with the aforesaid vertical guide beams cast in the finished lining. New sections of said guide beams are secured at their tops to the lower ends of those already installed, and are clamped at their lower ends to a template which is then plumbed and centered in the shaft. The metal forms, including a lower concrete-supporting ring, are then mounted on said guide beams. Said lower ring extends toward the shaft wall and the space between it and the wall is closed by piling up loose rock against the inside thereof.] Concrete is then poured into the space between said forms and the shaft wall and vibrated in the usual manner. *When the pouring is completed, and enough time has elapsed for the bottom of the concrete to have set, the template and the means stabilizing the forms against the lower parts of the hole can be removed.*

*In the foregoing, the operations are desirably carried on from a cage or lift, that can track upon the vertical beams in a previously cast section, carrying all of the parts for setting up the form structure in a subsequent section. During construction of a section, the cage can track upon the depending vertical beams as soon as they are suspended in place, thus, for example, carrying the template for the bottom parts into position.* While this concrete is setting the mucking operation is carried out to clear said second succeeding section of broken rock thereby leaving a ten foot clear section below the forms. The bottom is then drilled for the next blasting operation and the sequence is repeated.

A preferred embodiment of this invention is illustrated in the accompanying drawings, in which—

FIG. 5 is a plan view of a section of the concrete supporting lower ring;

FIG. 6 is a plan view of one of the upright form sections;

FIG. 7 is a plan view of the pouring section;

FIG. 8 is a side elevation of FIG. 7;

FIG. 9 is a section on line 9—9, FIG. 7;

FIG. 10 is a section on line 10—10, of FIG. 7;

FIG. 11 is a detailed plan view of the sealing gate for the pouring section;

FIG. 12 is a fragmentary vertical section of a portion of the shaft wall with all the forms in place;

Figure 2:
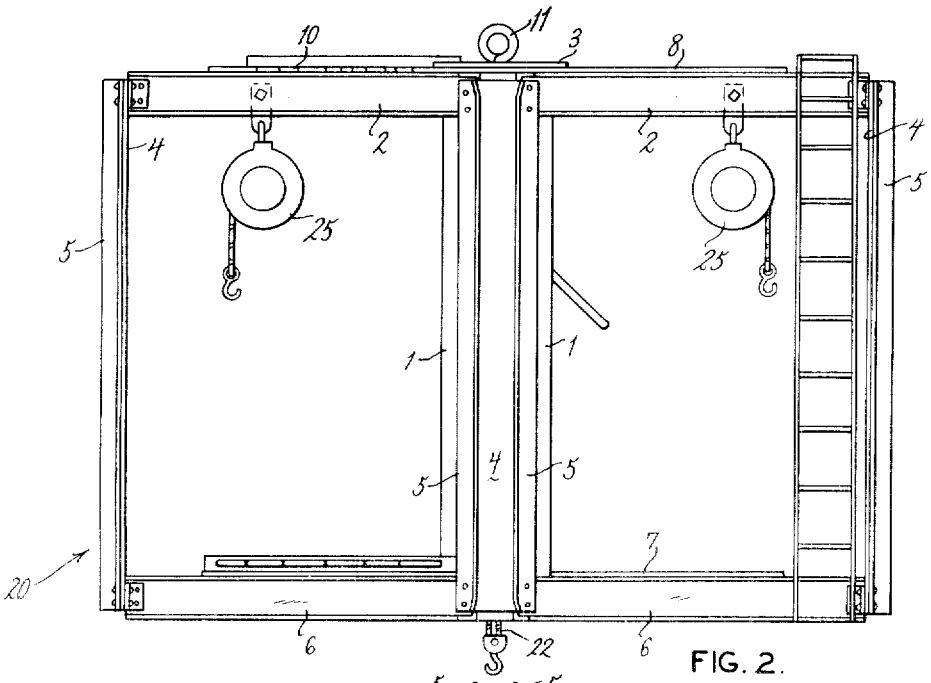
FIG. 2 is a side elevation of the same.

*The arrangement here described includes as its general constituents a form structure into which the concrete is poured, and a cage or lift 20 that can conveniently be used in assembling and dissassembling the forms. The structure for each section to be poured comprises the vertical beams 23, bolted by gusset plates 24 to similar beams in a previously-poured section above, and forming continuations thereof. The beams are secured to the wall of each concrete lining section in a manner to be described. The form structure also includes the template 21 to which bottoms of the vertical beams are securely held and positioned, means, here shown in the form of jacks 26, to stabilize the forms at their lower ends, bottom ring quadrants 34, wall panel quadrant forms 39, and other elements to be described in detail hereafter.*

Figure 1:
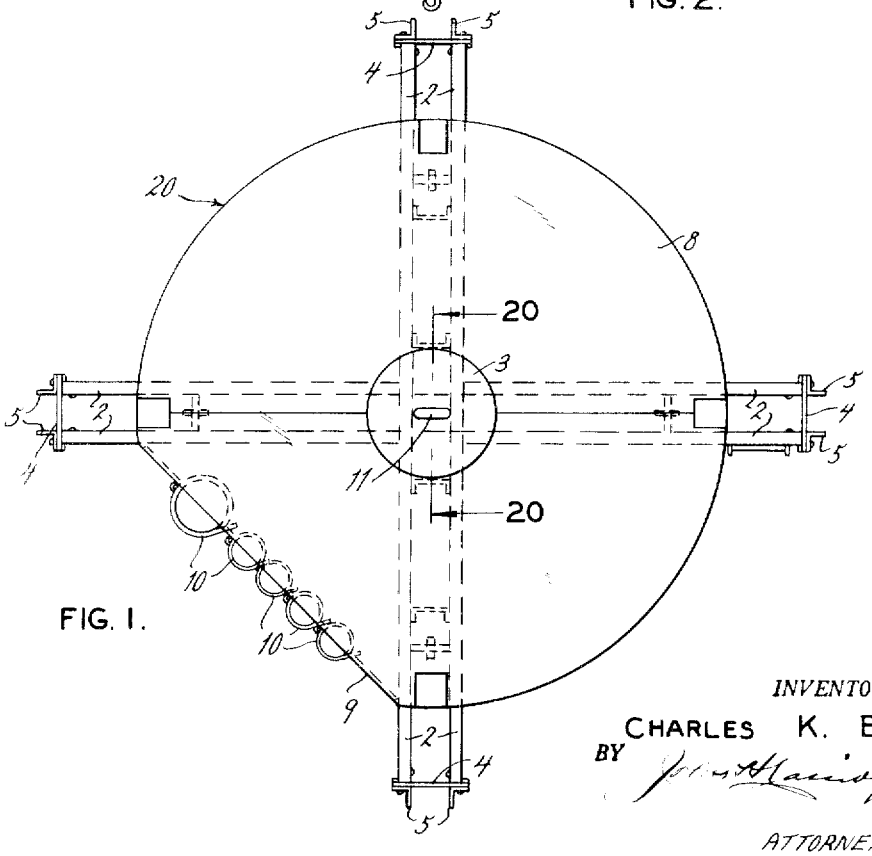
FIG. 1 is a plan view of a working cage, embodying this invention.
Figure 20:
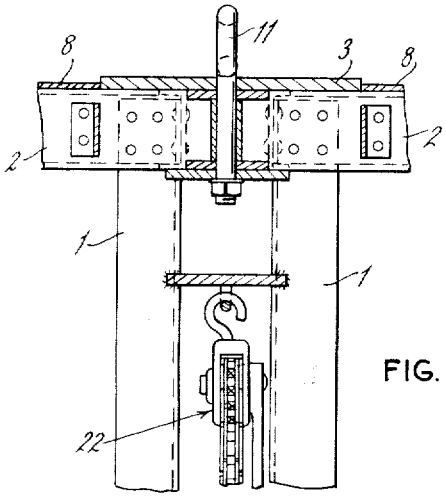
FIG. 20 is an enlarged section on line 20—20 of FIG. 1.
Figure 19:
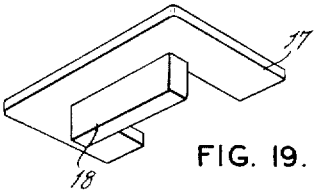
FIG. 19 is an enlarged perspective detail of the key plate.

Referring to the accompanying drawings, FIGS. 1 and 2 illustrate the working cage, indicated generally as 20. This comprises an upright central column formed of four angle beams 1 (FIG. 20). These are spaced symmetrically about a central axis, leaving a space there-between. At the upper end of this column four horizontal beams extend radially therefrom. Each of these beams is formed of a pair of channels 2, secured to a central plate 3, and connected at their outer ends to a vertical plate 4. The plate 4 extends downward from the channels 2 and has extending along each edge thereof, an angle bar 5, said bars 5 forming with the plate 4, a vertical channel. *The four channels thus formed provide the guide by which the cage engages over the vertical beams 23 in the walls of the liner to slide thereon as will be explained.* At the bottom of the central column formed by the beams 1, a similar structure of radial arms is provided, each arm consisting of a pair of channels 6, connected at their outer ends to the lower ends of the plates 4. A floor plate 7 is secured on top of the channels 6, and a ceiling plate 8 is secured on top of the channels 2. Said floor and ceiling plates are generally circular, except that in one quadrant thereof, they are cut off at an angle, as indicated at 9. This provides clearance in the type of shaft for which this particular cage was designed to provide clearance betwen the cage and the walls of the shaft to permit the cage to clear a sinking pump which might be suspended next to the side wall. This portion of the cage may be provided with a series of clamps 10 to which pipes may be secured, to be lowered into the shaft by the cage. An eye bolt 11, is provided by which the cage may be suspended, from the usual hoist at the top of the shaft.

Figure 3:
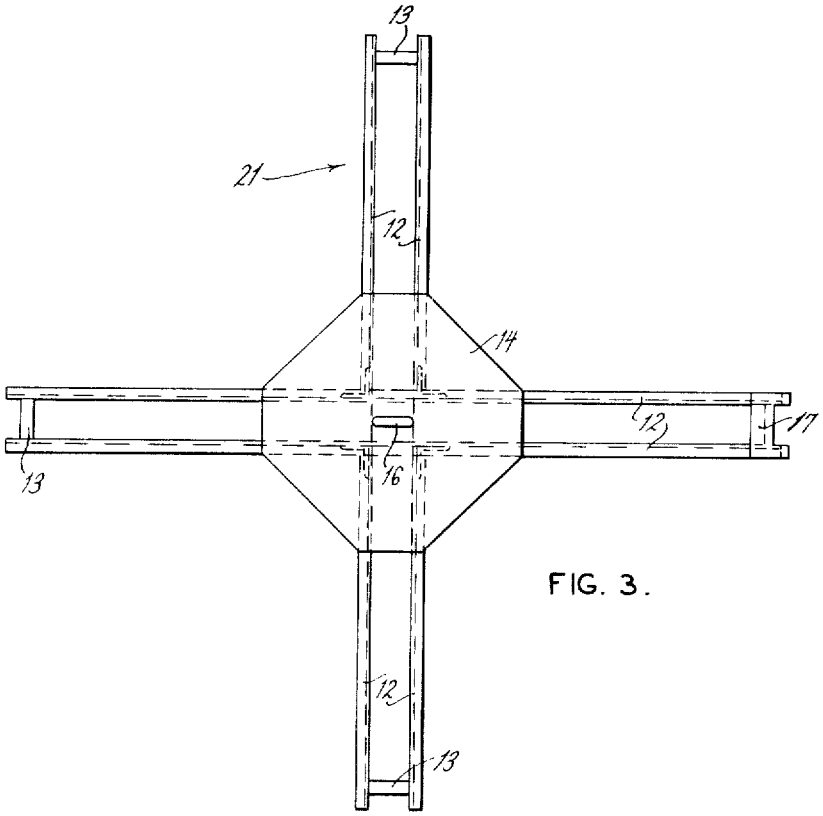
FIG. 3 is a plan view of the template.
Figure 4:
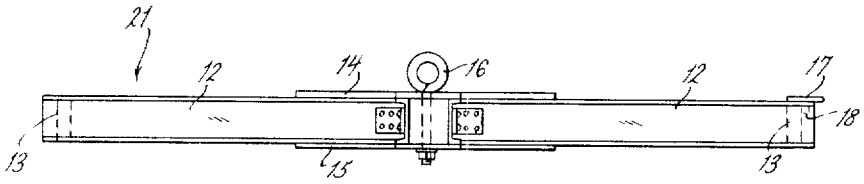
FIG. 4 is a side elevation of FIG. 3.

The template shown in FIGS. 3 and 4, indicated generally by the numeral 21, *is a removable means that constitutes the bottom component for the form framework. The template 21* comprises a series of radially extending arms formed of channels 12. As may be seen from FIG. 3, each arm is formed of two such channels spaced apart by end spacing plates 13, and connected at the center of the template by upper and lower web plates 14 and 15 respectively. An eye bolt 16 at the center of the strucure is provided for suspending the same on a hoist, as will be described later.

The plate 13 on each arm is spaced a short distance in from the end of the arm, so as to form a radial notch in said end. *The radial notches correspond in number and shape to the vertical beams 23, the notches fitting loosely over the beams to provide an initial positioning of the template onto the beams, and so that the beams guide and track the templates in vertical placement movements of the template. Each of the radial notches in the end of an arm of the template is* adapted to receive a removable key plate 17. The plate 17 is formed to fit between the ends of the channels 12, and has a shoulder 18, adapted to abut the plate 13. This plate is loosely inserted in said notch to provide the proper spacing between guide beams when the latter are placed against said key plates. It also brings the beams to proper distance apart and spaces them at 90° to properly place one in each quadrant. As will be described later, when the pouring operation is complete, these key plates are removed so as to provide clearance between the beams and the template for removal of the latter.

In accordance with the method of this invention, a shaft is sunk in a succession of steps. Each step includes excavating the bottom of the shaft to a predetermined depth beyond that already excavated, and casting a concrete shaft lining on the wall of the excavated section. As each section of the shaft lining is cast, the guide beams are installed and anchored to the concrete lining.

The first section at the top of the shaft may be excavated in any usual manner. As such top section is usually through soil, the procedure must be adapted to the nature of the soil. This may be true of not only the first but of one or two succeeding sections. After these initial sections have been excavated and the shaft lining cast, the subsequent excavation must usually be made through rock. This may involve drilling, blasting, mucking in any usual manner.

In accordance with the present method, *each of these initial sections should be provided with four (or other appropriate number) of vertical guide beams 23, secured firmly at the inner surface of the concrete thereon. These may be secured in the manner hereafter to be described in connection with subsequent sections. Then,* after such initial sections have been installed a succeeding ten foot section is blasted and cleared of debris and a second section is blasted. Thus a clear section is left between the section being blasted and the lower terminus of the concrete lining. This provides a safeguard aganist the likelihood of the concrete being shaken loose by the blast. At this point the cage 20 is loaded with the necessary parts, tools and other equipment. The template 21 is suspended below the cage on the hoist 22. *The template 21 and the cage 20 are tracked and guided upon the four beams 23 that are arranged in the sections of concrete already cast. At this time the key plates 17 need not be emplaced on the template so that the tracks can move freely up and down being generally guided by the four beams 23. In like manner, the cage rides upon the four beams 23 which engage in the four channels provided by the plates 4 and the angles 5 on the outer ends of the radial arms of the cage. In this way the cage and the template are guided*

*during their movements in the previously cast section of the concrete.* Usually during the lowering operation, the template is drawn up by a hoist 22 close to the bottom of the cage so as, in effect, to form an integral part of the cage, and to avoid binding on the guide beams. The extending arms of the cage and the template engage the guide beams already installed to be guided by them during the lowering operation.

New sections of guide beams 23, together with the necessary connecting plates 24, are carried by the cage. When the cage has been lowered to a point just above the lower ends of the guide beams already installed, its descent is arrested and it is held at that point. The workmen who ride down with the cage lower new guide beam sections 23 each by means of a hoist 25 through the channels formed by the plates 4 and the angle bars 5. The cage usually carries several of such hoists, as shown in FIG. 2. Usually one hoist is positioned for convenient handling of each of the guide beam sections. When a new guide beam section has been lowered to its proper position in extension of one of the previously installed guide beams, its upper end is connected to the latter by means of a pair of connecting plates 24. Ordinarily four such guide beam sections are installed. The connecting plates hold the beams 23, not yet supported at the bottom, rigid enough to lower the cage to the bottom of the shaft where the men can step off without the use of ladders. The cage is then hoisted several feet to provide clearance for the men on the bottom.

The template is then lowered to a point slightly above the lower ends of the guide beam sections by means of the chain hoist 22. (*FIG. 13*).

While the template is held in this position, each of its extending arms has secured thereto by bolts or otherwise a jack 26. This jack has a top plate 27, extending beyond the template arm in a position to receive the lower end of the guide beam 23. It is also formed with an angle plate 28 extending outward and downward so that its lower edge is close to the wall of the shaft. The jack 26 is also equipped with a foot in the form of a vertical screw 29 threaded into the plate 27. The screw 29 is equipped at its upper end with a shackle 30 by which it may be suspended on the hoist 25 for handling the same while connecting it to the template. When the four jacks 26 have been put in place, the hoist 22 is operated to elevate the template until the jacks come in contact with the lower ends of the guide beam sections 23.

Figure 13:
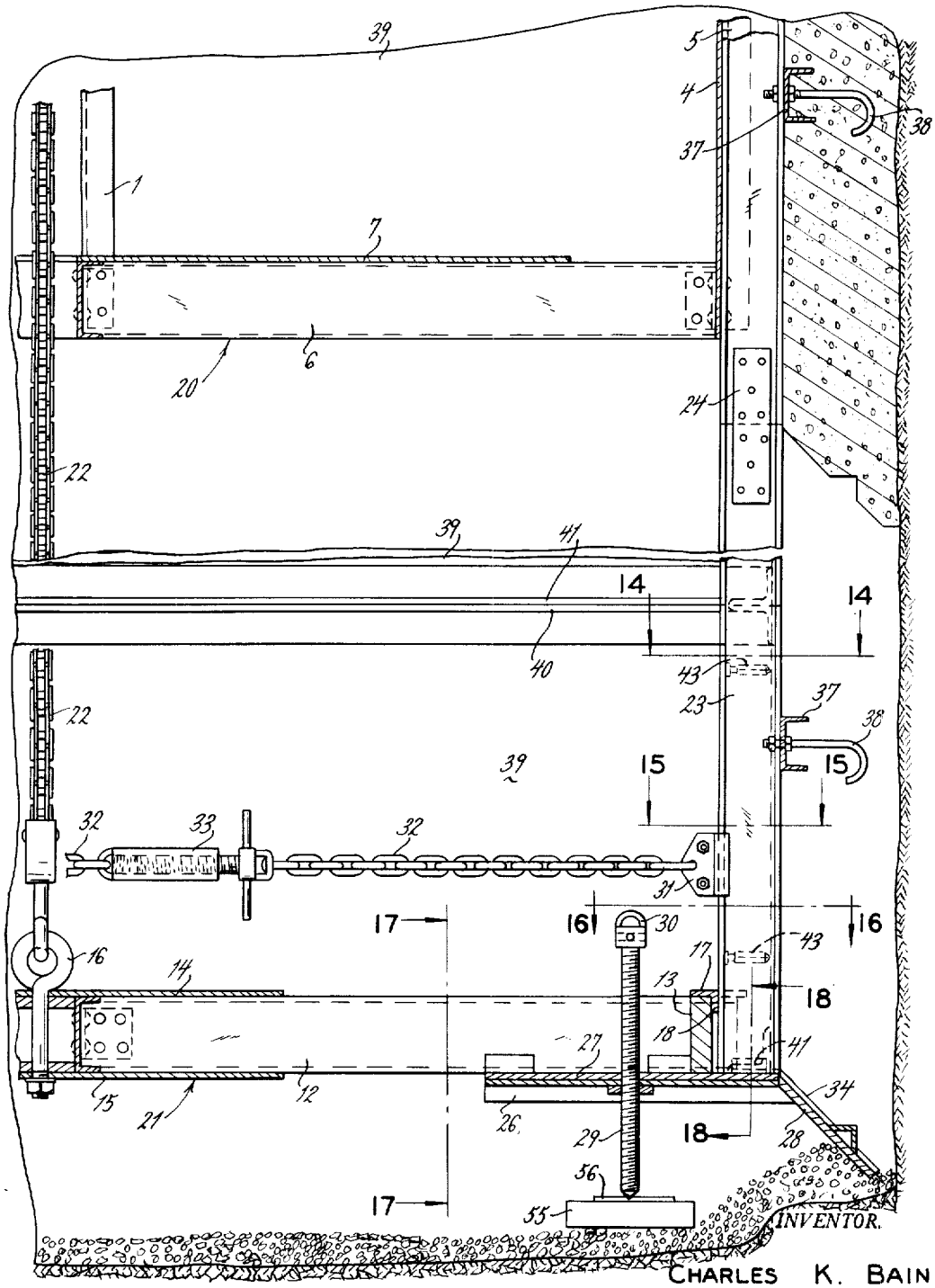
FIG. 13 is a section of a part of the shaft showing the relation of the guide beams, the template, and the forms during the process of mounting the same.
Figure 15:
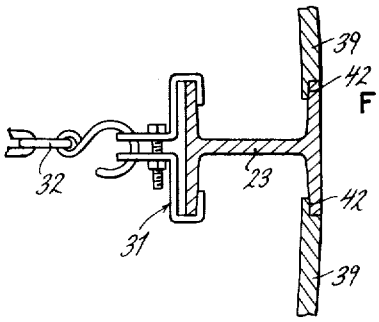
FIG. 15 is an enlarged section on line 15—15 of FIG. 13.

After the template has been positioned, as described above, a pair of clamping plates 31 is temporarily attached to each of the beams 23, as indicated in FIGS. 13 and 15. The key plates 17 are then placed in the notches at the ends of the template arms and the beams 23 moved into contact with said key plates. A chain 32 is then attached to the plates 31 and said chains from each pair of diametrically opposite beams are connected by a screw jack 33, which is tightened so as to haul in on the chains 32 thereby forcing the lower ends of the beams 23 inward against the key plates 17. This clamps the beams 23 against the template. The key plates 17 are dimensioned with reference to the template so as to provide the correct spacing of the lower ends of such beams both radially and laterally.

The template is now plumbed. This may be done by plumbing two of the beams 23 and moving the template until the correct adjustment is attained. When the template has been properly plumbed and centered in the shaft, the feet 29 are screwed down against a wooden block 55 protected by a steel plate 56. The block 55 rests upon a leveled spot on the loose rock. These feet then serve to support the template and the beams and at the same time to secure the same against any lateral shift which may throw it out of plumb. The structure, including the template and the beams 23 is now centered in the shaft.

In order to support the weight of the concrete shaft lining, a lower supporting ring is secured to the jacks 26. In the embodiment illustrated this ring is made in quadrants, one of said quadrants 34 being shown in plan view in FIG. 5 and in section in FIG. 12. It is generally conical in shape with its lower portion flared outward as shown in FIG. 12 and is provided with a horizontal top flange 35. The conical portion may be provided on its outer surface with an angular ridge 36. This is for the purpose of forming in the lower surface of the concrete lining a groove or offset, adapted to provide a key with the subsequently cast section. The quadrant 34 is bolted or otherwise secured at its ends to the portions 28 of the jacks 26. When the lower ring 34 has been installed, one or more bracing rings 37 are attached to the beams 23. (*FIGS. 13, 14*).

These rings are preferably formed in semi-circular half portions. These half portions are threaded into the space between beams 23 and the shaft wall as shown in FIG. 13, and are then bolted to the beams 23. The two ends of each half are bolted to opposite beams 23, thereby forming a complete circle around the shaft. Of course, where the shaft is non-circular in cross section, these bracing rings may be given a form corresponding to that of the shaft.

In the arrangement illustrated the rings 37 are provided at suitable intervals with anchoring members 38. These are shown in FIG. 13 as hooks, extending into the space between the beams 23 and the shaft wall and are embedded in the concrete lining when the latter is poured, thereby anchoring the rings 37 in said lining.

Figure 14:
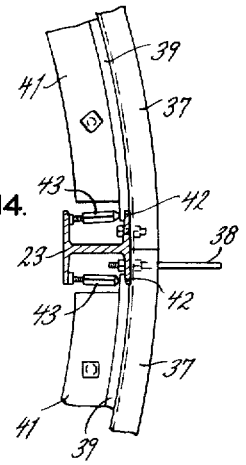
FIG. 14 is a section one line 14—14 of FIG. 13.
Figure 17:
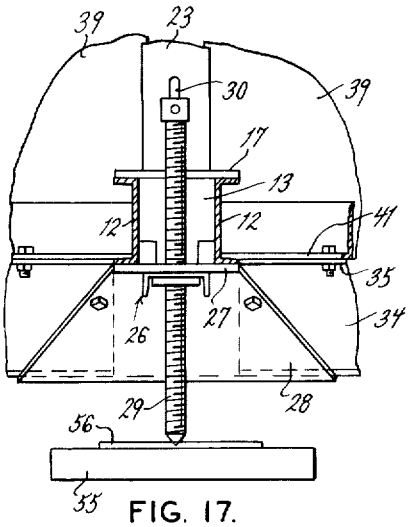
FIG. 17 is a section on line 17—17 of FIG. 13.

After the lower supporting ring has been installed, as described, upright forms are attached to the beams 23. The upright forms are provided in the shape of quadrants 39 shown in the drawing as of circular shape and provided with upper and lower flanges 40 and 41 respectively. The ends of the quadrants 39 are formed with shallow notches 42. When these forms are set in place, the notches 42 engage the flanges of the guide beams 23, as shown in FIG. 14. The lower flange 41 of the lowermost quadrant is bolted to the flange 35 of the lower ring as shown in FIG. 12. The upper flange 40 is in turn bolted to the lower flange 41 of another tier of forms 39 placed above the first one. The forms 39 are secured in place on the beams 23 by screw-jacks 43. These jacks are expanded between the inner flange of the beams 23 and the edge of the form 39, as shown in FIG. 14. Any suitable number of forms 39 may be used to build up the complete form to the total height of the shaft lining section which is to be cast.

The uppermost section of the form, however, is in the form of a pouring section 44. This also may be in quadrant form as illustrated in FIG. 7. It is provided with end flanges 45, also provided with notches 42. Intermediate said end flanges, a sloping trough portion 46, is arranged to receive the concrete when it is poured. As shown in FIG. 12, this pouring section is formed with a lower horizontal flange 47, which is bolted to the upper flange 40 of the top form section 39. As will be seen from FIG. 12, the concrete may be poured into the pouring section 44 from the top and will be guided into the space between the forms 39 and the shaft wall. This space is closed at the bottom by the supporting ring 34 and the loose rock piled thereagainst so that the concrete will be retained in this space to mould a shaft lining section. After the pouring operation has filled this space, a series of sealing gates 48 are inserted into the pouring trough. In order to support these gates, partitions 49 are formed at spaced points along the trough. Lugs 50 on the partitions 49 and the end flanges 45 support the gates 48 against the pressure of the concrete. At intervals along the trough section, draining openings 51, sealed by plugs 52, are provided. After the gates 48 have been put in place, the plugs 52 are removed and the excess concrete drained from the trough through the openings 51.

The beams 23 are now rigidly fastened at the top by the gusset plates to the previously installed beams, and rigidly supported at the bottom by the template and jacks. *By virtue of this secure fastening of the beam sections 23 in vertical extension of previously installed beams 23, the beams become accurately spaced both in vertical alignment and in depth from the surface. Each connection becomes a kind of bench mark representing accurately a certain depth from the surface. Thus, if the beam sections are 10 feet long, the end of each vertical beam will represent a 10 foot unit of depth from the surface. This condition is made more accurate by the fact that the gusset plates are pre-drilled with the bolt holes as are the beams themselves, and after the form framework of the beams and template is plumbed, it is supported from the bottom by jacks which tend to keep the top ends of the lowermost beam sections against the beams just above.*

*At this point the forms have been mounted onto the framework and the total form structure is ready for pouring of the concrete.* The cage is then raised to a position so the top deck affords a working platform for the men placing concrete. By wedging between the plates 4 and the newly placed beams the cage provides bracing in the intermediate positions of the beams, thus preventing distortion of the forms. The cage also provides a safe working platform for any subsequent work that might have to be performed in the shaft, as well as serving as a canopy for the protection of the men working in the shaft.

When the concrete has taken its initial set the template may be disconnected from the jacks 26, the key plates 17 removed and the template hauled out of the shaft along with the cage. The forms are now self-supporting. The jacks 26 may be removed and the mucking operation begun to clear the section below the forms. A new cycle may then start by drilling the next section. After the shaft has been sunk to its final depth there is usually a partition structure erected across the center thereof, dividing it into two shafts in each of which a skip is mounted for hauling men and materials up and down. In order that the cage 20 may be of use in the erection of this partition structure it is constructed so that one of its arms may be removed. Also, the floor and ceiling plates 7 and 8 are made in halves so that one half of each may be removed. This leaves a three-arm structure with semi-circular floor and ceiling plates which may be operated up and down the shaft, guided by the beams 23, to carry men and materials and to provide a work platform for the partition construction.

Figure 16:
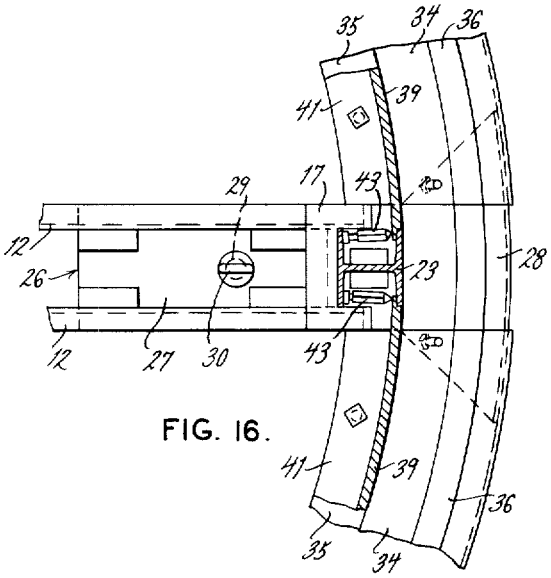
FIG. 16 is a section on line 16—16 of FIG. 13.
Figure 18:
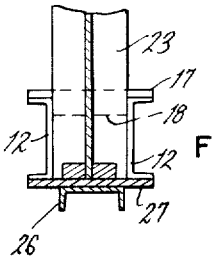
FIG. 18 is a section on line 18—18 of FIG. 13.

*In practicing the method, the step of suspending the beams 23 on other such beams in a higher section, automatically gives a lateral positioning for the beams and the ultimate form structure, with respect to the inner surface of the previously poured concrete liner. As shown in FIGURE 16, the outer surfaces of the beam 23 are continuous with the surfaces of the forms 39. Hence the concrete is poured against the beams 23, and the beams are always aligned against the inner surface of the adjacent concrete section. Beams added below those already in place thus become continuations of the beam to which they are attached, and their outer surfaces form continuations of the surface of the concrete section above. The depending sections are thus positioned by reference to the inner surface of the previous concrete lining section.*

*The weight of the framework is so great that it automatically assumes a generally vertical posititon below the plates 24. Hence, when the template is in place, the framework is already laterally positioned at the top by the beams 23 so as to become a continuation of the previous parts of the liner for reasons above given, and is stabilized at the top in such alignment because there are enough beams around the shaft to give stability and to prevent lateral displacement.*

*With the framework thus aligned and stabilized at the top, and depending, it is plumbed at the bottom. This is a final truing of its position, and insures that the entire framework is vertical, and aligned with previous sections. Since the forms 39 are automatically positioned by the beams, the truing of the framework means that the entire form structure, when fully assembled, hangs true. Then it is stabilized at the bottom by the jack screws 29 or other appropriate means, so as to remain in place during the pouring.*

*It will be noted that plumbing of the form framework requires the bottom of the framework to hang free of the excavation. This is accomplished by having the frame suspended and located from its upper end, and with its bottom end free of the walls and bottom of the hole until alignment is perfected. It will be evident that the bottom ring 34, being sized to be free of the walls of the excavation, can be located in place regardless of displacement of the lower end of the framework when it is moved into plumb position.*

*The placement of the face forms 39 after plumbing, instead of before, is a desirable addition to the process because there is less weight to put into accurate position, and more space to work in. When the frame is accurately located, the face forms become automatically positioned, since they are secured to the frame, and are located onto the beams 23 by the notches 42.*

*When the pouring into a form section has been completed to the top of the section, the template 21 and the jacks are removed. However, the main forms 39 and beam 23 may be left in place as the muck is cleared, and blasting performed below. The bottom ring 34 should be left in place. Then when the hole is ready, the form framework may be put up in a lower section, and then the concrete may be ready for removal of the forms 39 and the bottom ring 34, and their lowering to the lower section.*

*It will be seen that the crew may work almost continuously in putting in sections of the lining. It is unnecessary to wait until the concrete of one section is entirely hard to begin blasting and mucking below, because it is protected by the forms 39. This enables workers to proceed from the pouring without great delay, preparing another section of the shaft below. And the system for setting up framework and forms reduces the time and labor required heretofore for this type of operation.*

Various changes may be made in the details of construction, within the scope of the appended claims, without departing from the spirit of this invention. Parts of the invention may be used without the whole, and improvements may be added, while retaining some or all of the advantage of the invention.

I claim:

1. The method of sinking mine shafts, comprising, excavating a shaft section to a predetermined depth, *providing a concrete lining section in the shaft extending down to a predetermined distance above the bottom of the excavated section,* rigidly mounting a plurality of guide beams in vertical position along the sides of the excavated section, *the beam extending into the lining section against the inner surface thereof at a plurality of points around the interior thereof, thereby being aligned with the inner surface of the lining section, and depending into the excavated section but terminating above the bottom thereof;* [securing concrete-supporting bottom forms to the lower portions of said beams above the bottom of said excavated section,] *and connecting the lower ends of the suspended beams together into a rigid framework suspended in the excavation from above, and aligned at the top with the previous lining section, plumbing the suspended framework while it is suspended, and centering it in the shaft in vertical position, and securing the bottom of the framework in plumbed position against the surfaces of the excavation, whereby the framework is stabilized in vertical position; securing concrete-supporting bottom forms to the lower portions of said beams above the bottom of said excavated section,* securing upright forms to said beams to extend along the wall of said excavated section but spaced therefrom, said bottom forms *substantially but not wholly* closing the space between said upright forms and said wall, *whereby they avoid interference with the plumbing of the framework, then closing any space between the bottom forms and the walls of the excavation,* and pouring concrete between said upright forms and said wall to mold a shaft-lining section having its lower end spaced above the bottom of said excavated shaft section, *then clearing out a further excavated section below the one just poured, then rigidly mounting guide beams suspend thereinto as before and repeating the procedure to form a new lining section in the last excavated section including removing upright forms from a previously poured concrete lining section, and connecting them to the guide beams suspended in the further excavated section.*

[2. The method of sinking mine shafts, comprising, excavating a shaft section to a predetermined depth, rigidly mounting a plurality of guide beams in vertical position along the sides of the excavated section, securing concrete-supporting bottom forms to the lower portions of said beams above the bottom of said excavated section, securing upright forms to said beams to extend along the wall of said excavated section but spaced therefrom, said bottom forms closing the space between said upright forms and said wall, pouring concrete between said upright forms and said wall, excavating a succeeding shaft section below said first section, and in like manner molding a succeeding shaft-lining section below the preceding one.]

[3. The method of sinking mine shafts, comprising, excavating the shaft for a predetermined depth, rigidly mounting a plurality of guide beams in vertical position along the sides of the shaft, securing a lower concrete-supporting ring to the lower ends of said guide beams, securing removable forms to said guide beams, said forms extending along the shaft wall but spaced therefrom, pouring concrete between said forms and the shaft wall to mold a shaft-lining section, after the concrete has set removing said forms and said lower ring, and repeating the foregoing sequence of operations to mold a succeeding shaft-lining section below the preceding one.]

4. The method of sinking mine shafts, comprising, excavating the shaft for a predetermined depth, rigidly mounting a plurality of guide beams in vertical position along the sides of the shaft, bracing said beams by securing the same to a rigid bracing ring running around the outside of said beams between them and the shaft wall, securing a lower concrete-supporting ring to the lower ends of said guide-beams, securing removable forms to said guide beams, said forms extending along the shaft wall but spaced therefrom, pouring concrete between said forms and the shaft wall to mold a shaft-lining section, after the concrete has set removing said forms and said lower ring, and repeating the foregoing sequence of operations to mold a succeeding shaft-lining section below the preceding one.

5. The method of sinking mine shafts in which the shaft is extended downward in a series of successive steps, one step comprising, excavating the shaft for a predetermined depth, lowering into the shaft a working cage carrying a plurality of guide beams and having attached therebelow a separable structure providing a positioning template, securing the upper ends of said guide beams to similar beams previously secured to concrete shaft lining previously cast, securing the lower portions of said guide beams to said template, plumbing and locating said template in the shaft, securing a lower concrete-supporting ring to the lower ends of said guide beams, mounting removable forms on said guide beams, said forms extending along the shaft wall but spaced therefrom, pouring concrete between said forms and the shaft wall to mold a shaft-lining section, whereby said bracing ring becomes embedded in the concrete, and after the concrete has set removing said forms and said lower ring.

6. The method of sinking mine shafts in which the shaft is extended downward in a series of successive steps, one step comprising, excavating the shaft for a predetermined depth, lowering into the shaft a working cage carrying a plurality of guide beams and having attached therebelow a separable structure providing a positioning template, securing the upper ends of said guide beams to similar beams previously secured to concrete shaft lining previously cast, bracing said beams by securing the same to a rigid bracing ring running around the outside of said beams between them and the shaft wall, securing the lower portions of said guide beams to said template, plumbing and locating said template in the shaft, securing a lower concrete-supporting ring to the lower ends of said guide beams, mounting removable forms on said guide beams, said forms extending along the shaft wall but spaced therefrom, pouring concrete between said forms and the shaft wall to mold a shaft-lining section, whereby said bracing ring becomes embedded in the concrete, and after the concrete has set removing said forms and said lower ring.

7. The method of sinking mine shafts in which the shaft is extended downward in a series of successive steps, one step comprising, excavating the shaft for a predetermined depth, lowering into the shaft a working cage carrying a plurality of guide beams and having attached therebelow a separable structure providing a positioning template, securing the upper ends of said guide beams to similar beams previously secured to concrete shaft lining previously cast, securing the lower portions of said guide beams to said template, plumbing and locating said template in the shaft, securing a lower concrete-supporting ring to the lower ends of said guide beams, mounting removable forms on said guide beams, said forms extending along the shaft wall but spaced therefrom and having a pouring trough at their top, pouring concrete between said forms and the shaft wall to a level sufficient to join with the lower end of said shaft lining previously cast, and sealing off said pouring trough along a vertical surface at the junction with said previously cast lining.

8. An apparatus for use in sinking mine shafts, comprising, a horizontally extending frame having lateral extensions engageable by vertical guide beams on the shaft wall and formed to provide a template for locating said beams, means for securing said beams to said extensions, and adjustable feet for supporting said template on the shaft bottom.

9. An apparatus for use in sinking mine shafts, comprising, a horizontally extending frame having lateral extensions engageable by vertical guide beams on the shaft wall and formed to provide a template for locating said beams, means for securing said beams to said extensions, and a suspension connection for hanging said template on a cage.

10. An apparatus for use in sinking mine shafts, comprising, a horizontally extending frame having lateral extensions engageable by vertical guide beams on the shaft wall and formed to provide a template for locating said beams, removable dimensioning keys on said extensions engageable by said beams, means for securing said beams to said extensions, and adjustable feet for supporting said template on the shaft bottom.

11. An apparatus for use in sinking mine shafts, comprising, a working cage adapted to be lowered into the shaft having guide channels engageable with guide beams on the shaft wall, a hoist on said cage, a horizontally extending frame having lateral extensions engageable with said guide beams for lowering said frame into the shaft and formed to provide a template for locating extensions of said beams, and a suspension connection on said template for hanging the same on said hoist below said cage.

12. An apparatus for use in sinking mine shafts, comprising, a working cage adapted to be lowered into the shaft having guide channels engageable with guide beams on the shaft wall, a hoist on said cage, a horizontally extending frame having lateral extensions engageable with said guide beams for lowering said frame into the shaft and formed to provide a template for locating extensions of said beams, and a suspension connection on said template engageable with said hoist, said cage and hoist being constructed and arranged for operation to lower said template to the lower ends of such extensions of said beams while said cage is adjacent the upper ends thereof.

13. An apparatus for use in sinking mine shafts comprising; a working cage having an upright center column, laterally extending ceiling and floor structures at the upper and lower ends, respectively, of said column, and vertical channel members extending between said ceiling and floor structures and engageable with guide members on the shaft wall; and suspension connections on said cake attachable to a hoist for raising and lowering said cage in the shaft, whereby men, equipment and materials may be lowered into the shaft and hoisted therefrom.

14. An apparatus for use in sinking mine shafts comprising; a working cage having an upright center column, laterally extending ceiling and floor structures at the upper and lower ends, respectively, of said column, and vertical channel members extending between said ceiling and floor structures and engageable with guide members on the shaft wall; and suspension connections on said cage attachable to a hoist for raising and lowering said cage in the shaft, whereby men equipment and materials may be lowered into the shaft and hoisted therefrom, said floor structure having one or more openings through which guide beams may be lowered, and a hoist on said cage operable to lower a beam through said opening.

15. An apparatus for use in sinking mine shafts comprising; a working cage having an upright center column, laterally extending ceiling and floor structures at the upper and lower ends, respectively, of said column, and vertical channel members extending between said ceiling and floor structures and engageable with guide members on the shaft wall; and suspension connections on said cage attachable to a hoist for raising and lowering said cage in the shaft, whereby men, equipment and materials may be lowered into the shaft and hoisted therefrom, said floor structure having one or more openings through which guide beams may be lowered, a hoist on said cage operable to lower a beam through said opening, a second hoist centrally located on said cage, and a horizontally extending frame suspended on said second hoist below said cage and having lateral extensions engageable with said guide members and formed to provide a template for locating the lower ends of guide beams lowered through said openings.

*16. In a method of making forms for lining shafts with concrete, the steps of: excavating the shaft for a predetermined depth; providing a concrete lining section in the excavation terminating above the bottom thereof by more than the vertical depth of another concrete lining section; rigidly but removably mounting a structure which is adapted to support forms for shaping the lining surface in vertical position along the sides of the excavated section below the concrete lining section, by first suspending the structure in the excavation from the concrete lining section with its lower parts hanging free of the walls of the excavation, aligning the top of the structure by members engaging the inner surface of the concrete lining section at a plurality of points around the inner surface thereof and continuous with portions extending into the structure to position the suspended structure with relation to the inner surface of the concrete lining section, plumbing the suspended structure and positioning it so that it is vertical, and stabilizing the suspended and plumbed structure, means against the walls of the excavation by bracing the same against said walls, thereby making the structure rigid in the excavation.*

*17. In the method of claim 16, the steps of embedding support means in each concrete lining section during formation thereof, and then suspending the structure for a new section from the said embedded means.*

*18. In the method of claim 16, the stabilizing of the form means including the step of supporting and applying an upward force to the bottom of the suspended structure, whereby to aid in supporting the structure.*

*19. In a method of making a concrete lining for a shaft, the steps of: excavating a hole to a predetermined depth and forming a concrete lining section therein, securing onto said concrete lining section means for suspending composite structure incorporating a plurality of elements spaced about the hole for use in making a form for a concrete section below the previously-mentioned section, suspending the said composite structure in the hole from the suspending means, in spaced relation to but near to the walls of the hole, aligning the said structure at the top with respect to the previously-mentioned concrete section, while the structure is suspended, and fixing same in aligned position; plumbing the structure and moving it into vertical position, while it is suspended, and stabilizing it against walls of the hole, in said vertical position so that it cannot move out of position; incorporating with the structure upright and bottom forms, pouring concrete into the forms; and removing the forms from the concrete after the concrete has become self-supporting, for use thereafter in making another lower section of concrete.*

*20. In a method of making linings for deep shafts, the steps of: excavating a predetermined depth; making a lining section of concrete extending downwardly to a level above the bottom of the excavation, embedding into the concrete at a predetermined level above the bottom of the lining section orienting and connecting means providing a plurality of fixed locations at said level around the shaft; connecting the embedded means and elongated members and disposing the elongated members so connected in vertical positions at said locations, thus orienting the elongated members around the shaft by means of the embedded means; providing extensions of said elongated members depending into the excavation below the lining section, securing the elongated members together into a rigid structure, making the same vertical and incorporating upright and bottom forms therewith; also providing at a predetermined level on said elongated members additional orienting and connecting means to become embedded in concrete poured against the forms; the additional means thereby being enabled to act as points to orient the elongated members around the shaft lining.*

References Cited by the Examiner

The following references, cited by the Examiner, are of record in the patented file of this patent or the original patent.

UNITED STATES PATENTS

| | | | |
|---|---|---|---|
| 1,003,140 | 9/1911 | Lardy | 61—41 |
| 1,834,751 | 12/1931 | Upson. | |

FOREIGN PATENTS

| | | |
|---|---|---|
| 363,690 | 1906 | France. |
| 420,117 | 10/1925 | Germany. |
| 323,684 | 1/1930 | Great Britain. |

CHARLES E. O'CONNELL, *Primary Examiner.*

JACOB SHAPIRO, *Examiner.*